(12) United States Patent
Terao et al.

(10) Patent No.: US 6,663,142 B2
(45) Date of Patent: Dec. 16, 2003

(54) STEERING WHEEL FOR A VEHICLE

(75) Inventors: Atsushi Terao, Shizuoka-ken (JP); Yoshinori Maeda, Kanagawa-ken (JP)

(73) Assignees: Nihon Plast Co., Ltd., Shizuoka-ken (JP); Nissan Motor Co., Ltd., Kanagawa-ken (JP)

( * ) Notice: Subject to any disclaimer, the term of this patent is extended or adjusted under 35 U.S.C. 154(b) by 0 days.

(21) Appl. No.: 09/735,917

(22) Filed: Dec. 14, 2000

(65) Prior Publication Data

US 2001/0011814 A1 Aug. 9, 2001

(30) Foreign Application Priority Data

Dec. 14, 1999 (JP) .......................................... P11-355022

(51) Int. Cl.⁷ ............................................. B60R 21/16
(52) U.S. Cl. .................................... 280/731; 280/728.2
(58) Field of Search ............................... 280/731, 728.2; 74/552

(56) References Cited

U.S. PATENT DOCUMENTS

| | | | | | |
|---|---|---|---|---|---|
| 5,060,535 A | * | 10/1991 | Fujita | ........................... | 74/552 |
| 5,070,742 A | * | 12/1991 | Sakane et al. | ................. | 74/552 |
| 5,085,097 A | * | 2/1992 | Harata et al. | .................. | 74/552 |
| 5,090,731 A | * | 2/1992 | Fujita et al. | ................... | 74/552 |
| 5,134,899 A | * | 8/1992 | Nagata et al. | ................. | 74/552 |
| 5,244,230 A | * | 9/1993 | Komiya et al. | ................ | 74/552 |
| 5,310,218 A | * | 5/1994 | Miyoshi et al. | ............. | 280/731 |
| 5,356,173 A | * | 10/1994 | Hongou et al. | ............. | 280/731 |
| 5,476,022 A | * | 12/1995 | Koyama et al. | ............... | 74/552 |
| 6,003,406 A | * | 12/1999 | Lee et al. | ....................... | 74/552 |
| 6,073,514 A | * | 6/2000 | Isomura | ........................ | 74/552 |
| 6,079,737 A | * | 6/2000 | Isomura et al. | ............. | 280/731 |
| 6,139,051 A | * | 10/2000 | Fujita | ........................... | 280/731 |

FOREIGN PATENT DOCUMENTS

| | | | | |
|---|---|---|---|---|
| DE | 3921333 A1 | * | 1/1991 | ............ B62D/1/08 |
| JP | 5-19058 | | 3/1993 | |
| JP | 5116581 A | * | 5/1993 | ............ B60R/21/20 |
| JP | 5-56735 | | 7/1993 | |
| JP | 5193503 A | * | 8/1993 | ............ B62D/1/11 |
| JP | 5254380 | * | 10/1993 | ............ B60R/21/20 |
| JP | 5-278619 | | 10/1993 | |
| JP | 6-144242 | | 5/1994 | |
| JP | 6255495 A | * | 9/1994 | ............ B62D/1/11 |
| JP | 7-2179 | | 1/1995 | |
| JP | 8-207782 | | 8/1996 | |
| JP | 11-59435 | | 3/1999 | |

* cited by examiner

Primary Examiner—Paul N. Dickson
Assistant Examiner—Joselynn Y Sliteris
(74) Attorney, Agent, or Firm—McDermott, Will & Emery

(57) ABSTRACT

A transversely extending metal core member is fixed to a steering shaft, and a downwardly extending metal core member formed with a weakened part has a padding part mounted thereon at a lower position than the weakened part.

8 Claims, 4 Drawing Sheets

STEERING WHEEL FOR A VEHICLE

BACKGROUND OF THE INVENTION

The present invention relates to a steering wheel for a vehicle.

The structure of a vehicular steering wheel has a boss mounted to a steering shaft and an annular rim, these elements being linked via intervening spokes (refer to Japanese Patent Application Laid-Open Publication No. 11-59435, which discloses similar technology). With the steering shaft mounted to the body of the vehicle at a prescribed angle upward from a front bottom part of the vehicle inclined upwards in the rearward direction, the boss and rim are inclined toward the front of the vehicle, with the lower edge thereof protruding rearwardly. Elements such as a horn pad and airbag module are provided on a pad mounted to the boss. In arrangement provided with an airbag module, an airbag can be deployed toward an occupant when a collision occurs.

A metal core is provided inside the pad and spokes, extending from the steering shaft to the rim, the rim being supported by the strength of this metal core. As noted above, the rim is inclined so as to protrude rearwardly at the bottom edge thereof, so that the body of the occupant makes contact with the bottom edge of the rim first.

SUMMARY OF THE INVENTION

For this reason, to protect the occupant, the strength of the inner metal core is optimally adjusted so as to soften the shock imparted to the occupant, by having the bottom edge of the rim bend toward the front, as it comes into contact with the occupant. Although an excessively weak core causes a reduction in supporting strength, from the standpoint of occupant protection, it is not desirable to have an excessively rigid core, while the strength adjustment is made so that both of these conditions are satisfied.

Like this, in a vehicular steering wheel of the past, although adjustment of the inner metal core achieved a high degree of occupant protection, in recent years there have been demands for even further occupant protection characteristics.

Accordingly, in order to meet the above-noted demand for improved occupant protection, it is an object of the present invention to provide a steering wheel for a vehicle enabling a further increase in the degree of protection characteristics provided to an occupant when a vehicle collision occurs, in a part thereof that is not subjected to strength adjustment.

To achieve the object, according to a first aspect of the present invention, there is provided a steering wheel for a vehicle, comprising a boss mounted to a vehicle, a rim configured annular, and inclined with a lower edge thereof protruding rearward, a spoke interconnecting the boss and the rim, a metal core passing through the boss and the spoke, and extending to the rim, the metal core having a weakened first part, and a pad mounted to a second part of the metal core lower than the first part, and inclined with a lower edge thereof protrucing rearwardly.

BRIEF DESCRIPTION OF THE DRAWINGS

The above and other features will be better understood from an exemplary embodiment described below, taken together with the drawings, of which.

DETAILED DESCRIPTION OF THE PREFERRED EMBODIMENTS

Figure 1:
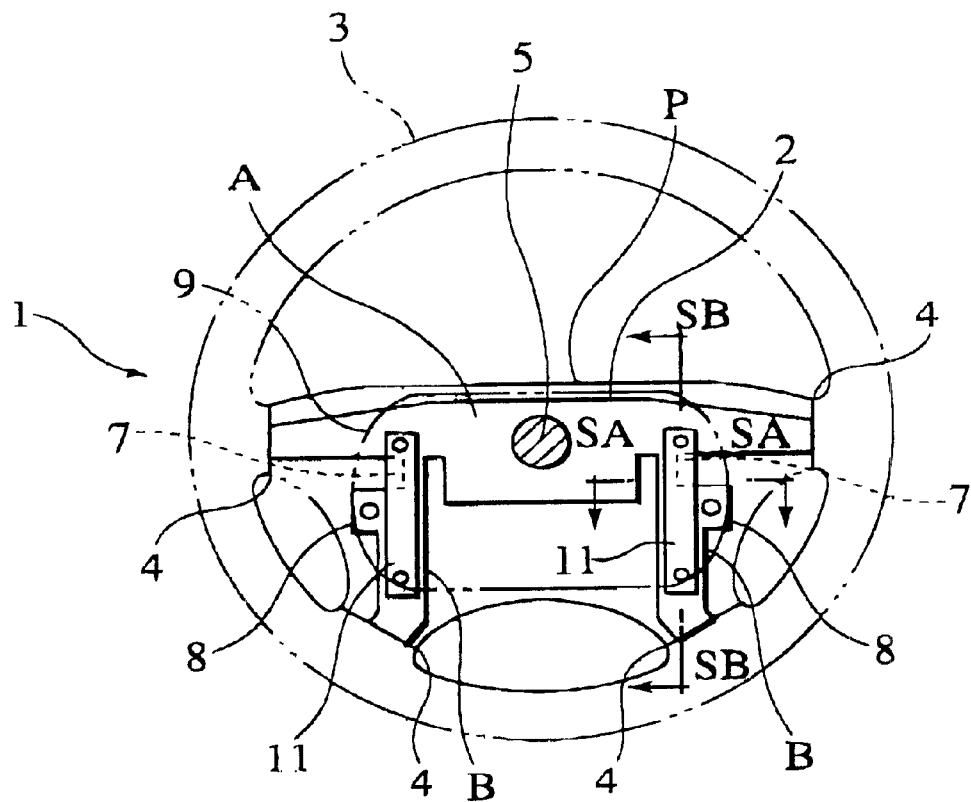
FIG. 1 is a front elevation showing the internal structure of a steering wheel according to an embodiment of the present invention.
Figure 2:
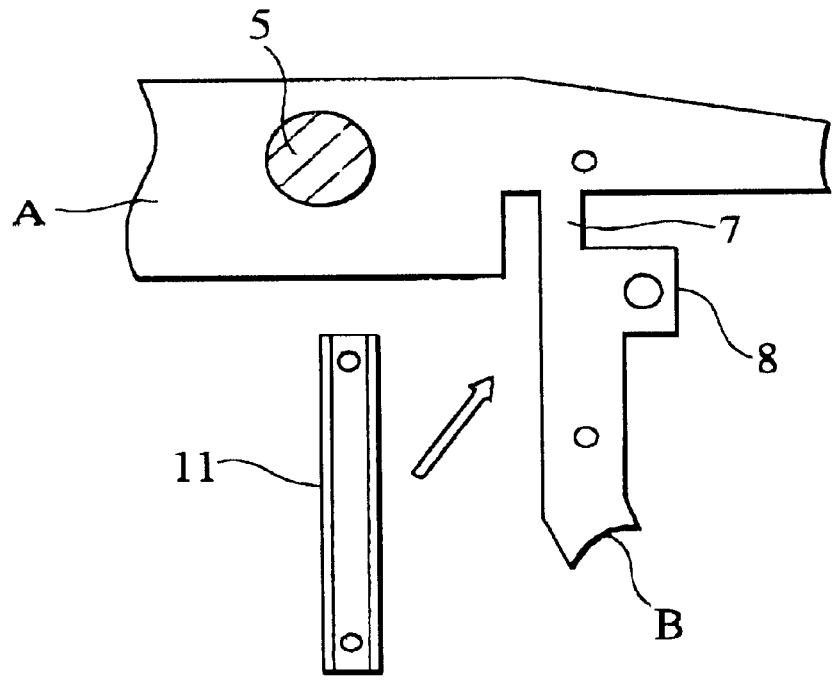
FIG. 2 is an enlarged view of a weakened part of a metal core of the steering wheel.
Figure 3:
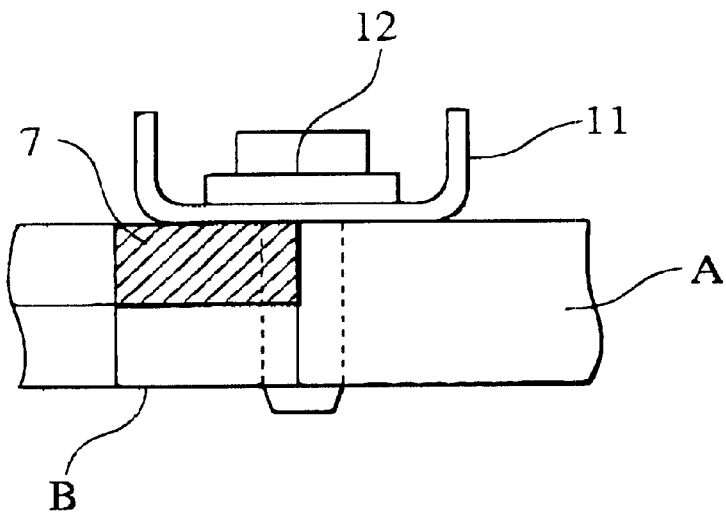
FIG. 3 is a cross-sectional view along line SA—SA of FIG. 1.
Figure 4:
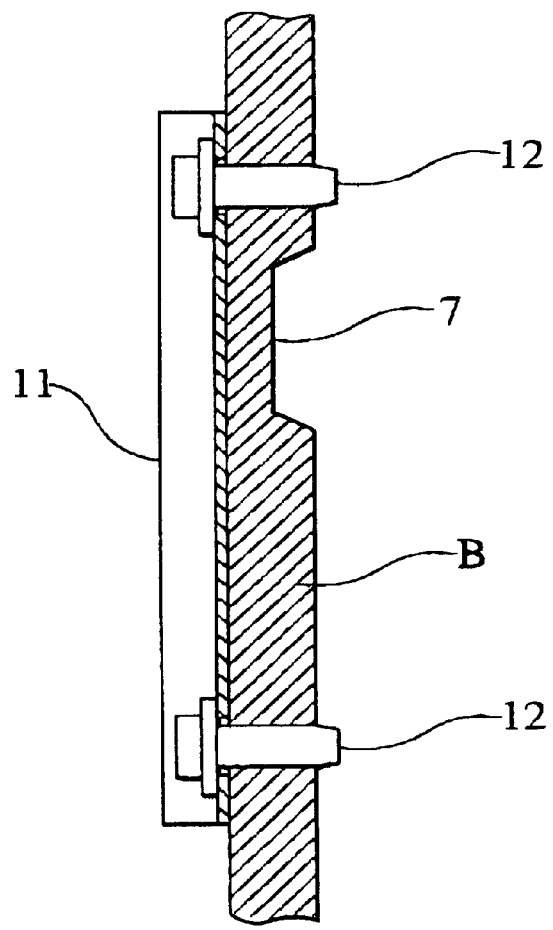
FIG. 4 is a cross-sectional view along line SB—SB of FIG. 1.
Figure 5:
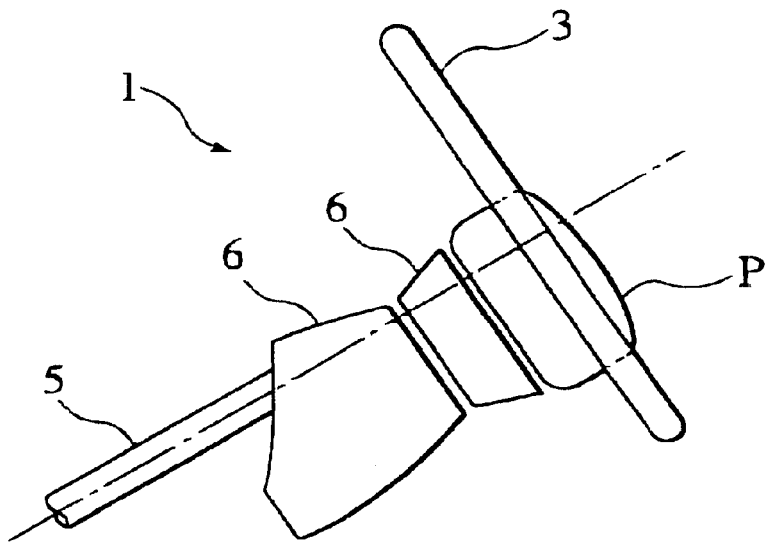
FIG. 5 is a side elevation showing the steering wheel.

There will be described below a preferred embodiment of the present invention, with reference to FIG. 1 to FIG. 7. A four-seated automobile V shown in FIG. 7 includes a steering wheel 1 according to the embodiment of the invention, which has, as shown in FIG. 1, a boss 2 and an annular rim 3, to which are joined four short spokes 4. The upper end of a steering shaft 5 is disposed at the center of the boss 2, the steering shaft 5 being fixed to the rim 3, which extends in a transverse direction. A first metal core member A passes through the spokes 4 from the upper end of the boss 2 and is joined to the rim 3. The reference numeral 6 in FIG. 5 and FIG. 6 denotes a cover, which covers an upper part of the steering shaft 5.

From positions of the first metal core member A separated to the left and right from the steering shaft 5, second metal core members B extend downwardly, these second metal core members B being joined to the rim 3 after passing between the two lower spokes 4. Weakened parts 7, each respectively made both narrow and thin, are formed at the upper ends of the second metal core members B, which are connected to the first metal core member A. Because these weakened parts can be formed by merely making them narrow or thin, their formation is facilitated. Furthermore, because the second metal core members B are connected at positions on the first metal core member A that are separated from the steering shaft 5, thereby avoiding the steering shaft 5, it is possible to establish the height of the weakened parts 7 to be approximately the same as the height of the steering shaft 5.

Mounting ears 8 are formed below the weakened parts 7 so as to protrude toward the left and right, a padding part P being mounted thereat. The padding part P serves also as a horn button, and has an airbag module 9 provided therewithin. An airbag 10 is stored in a folded-up condition within the airbag module 9, this airbag being deployed within the occupant compartment of the vehicle by gas fed into it from an inflator (not shown in the drawing).

A metal bracket 11 is mounted on the boss 2, which is straddling across the weakened parts 7. The bracket 11 has a channel-shaped cross-section, the upper end and lower end of the bracket 11 being joined to the lower part of the second metal core members B by the screws 12. Because the bracket 11 does not have that much strength, when the second metal core members B bend at a corresponding weakened part 7, the bracket 11 bends in concert with the second core members B. Because the bracket 11 bends together with the weakened parts 7, it is possible to adjust the bending strength of the second metal core member B at the weakened parts 7 by merely changing the strength (that is, the shape or material) of the bracket 11, thereby providing an inexpensive method of adjusting the bending strength. Additionally, because the upper end of the bracket 11 is joined to the first metal core member A, which is relatively high in strength, the mounting rigidity of the bracket 11 is improved, so that a given strength can be achieved with a smaller and thinner bracket 11, thereby contributing to a reduction in the weight of the steering wheel 1.

Figure 6:
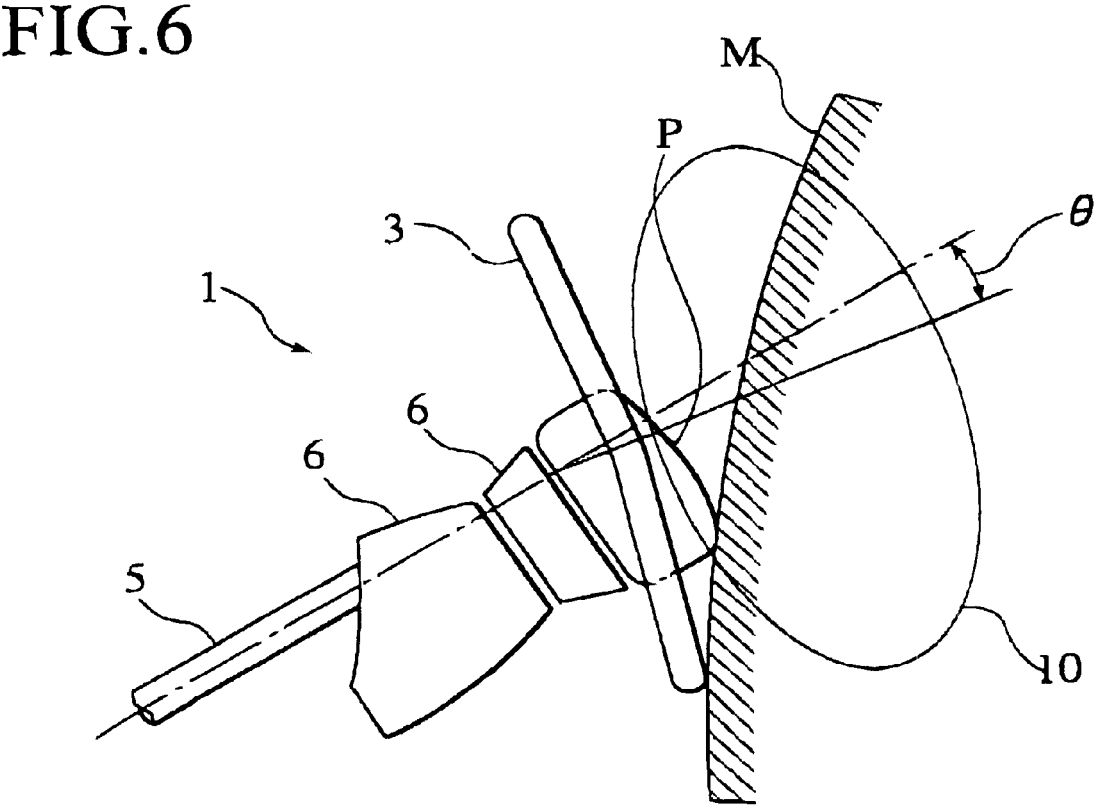
FIG. 6 is a side elevation showing the steering wheel when a vehicle is subjected to a collision.
Figure 7:
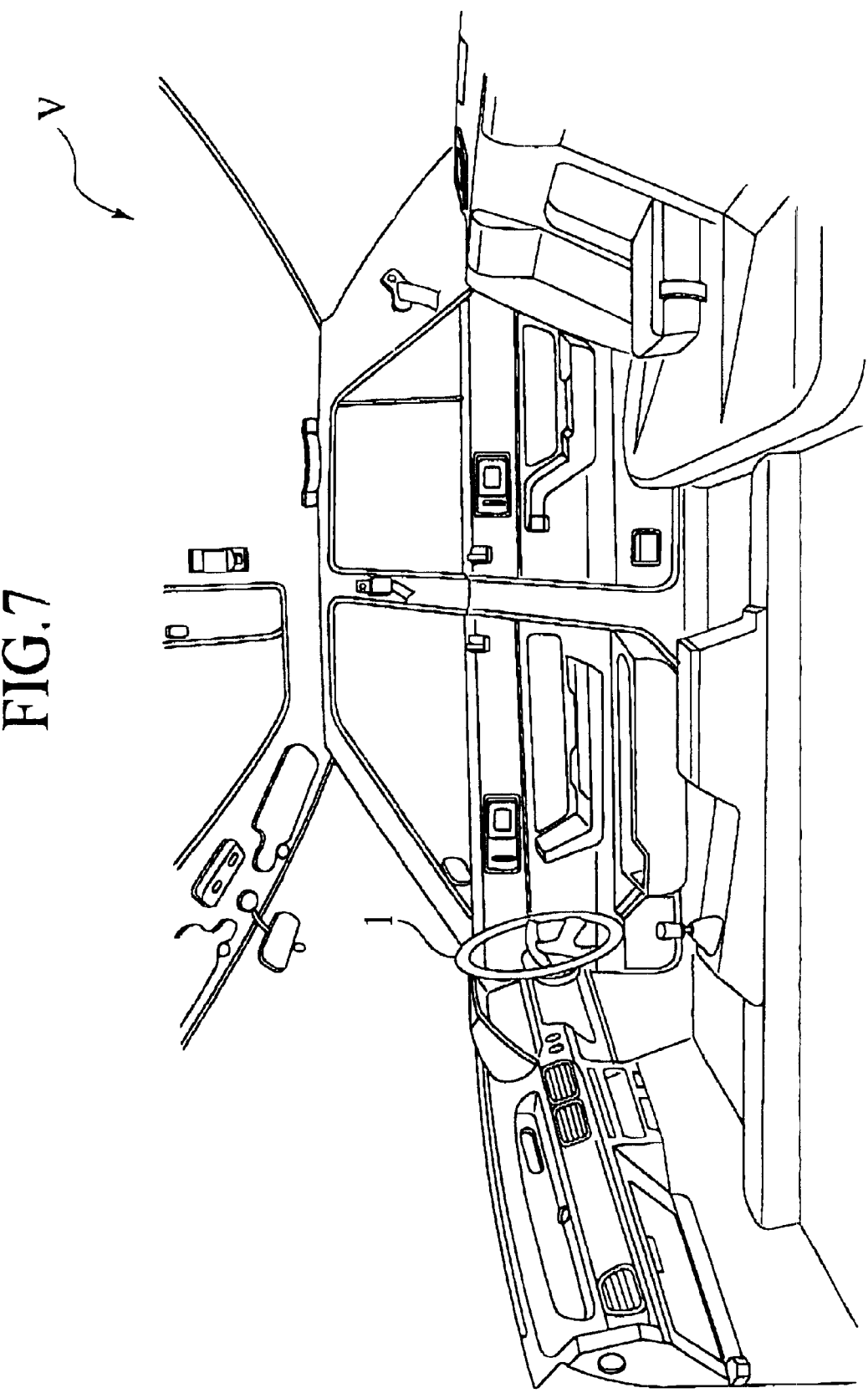
FIG. 7 is an overall view of the interior of the vehicle in a normal state, with front seats removed.

Referring to FIG. 6, the effect of this embodiment in operation is as follows. When the vehicle is subjected to a collision, the occupant M tilts forward due to a force of momentum, so that the occupant M first comes into contact with the lower edge of the rim 3. When this occurs, because weakened parts 7 are formed at the upper part of the second metal core members B that support the rim 3, the lower edge of the rim 3 bends forwardly about the weakened parts 7 as a center. Therefore, the first-stage shock of the occupant M striking the rim 3 is softened.

Next, the body of the occupant M comes into contact with the lower edge of the padding part P, this padding part P rotating through an angle θ as shown at the center of FIG. 6. In particular, because the padding part P is mounted to the second metal core members B extending upwardly and downwardly, not only is the mounting of the padding part P made securely, but also that it is possible to cause the padding part P to rotate directly forwardly, about the weakened parts 7 as a center. The effect of this forward rotation of the padding part P is that the lower edge thereof moves forward, so that the second-stage shock of the occupant M striking the padding part P is softened.

By the padding part P rotating through the angle θ, the direction of deployment of the airbag 10 from the airbag module 9 is inclined downwardly by this angle θ, so that the airbag 10 is directly opposing the occupant M tilting forwardly, thereby providing improved protection for the occupant.

According to the embodiment, a steering wheel 1 for a vehicle V is provided with a boss 2 mounted to a steering shaft 5 and an annular rim 3, linked via an intervening spoke part 4, and a metal core (A+B) passing from the steering shaft 5 through the boss 2 and the spoke part 4 and extending to the rim 3, the rim 3 and a pad part P mounted to the metal core being shaped in an inclined manner so that lower edge parts thereof protrude rearwardly, wherein a corresponding weakened part 7 is provided in a part of the metal core.

The pad part P is mounted at a position lower than the weakened part 7, so that when the vehicle V is subjected to a collision the body of an occupant M comes into contact with the bottom edge of the pad part P, which rotates forwardly about the weakened part 7 as a center, thereby softening the shock occurring by contact with the occupant. That is, in contrast to related technology of the past, in which there was merely a softening of the shock between a lower edge of a rim and an occupant, with the present invention there is an additional softening of the shock between the occupant M and the boss 2, thereby providing additional occupant protection.

Further, the pad part P is provided with an airbag module 9. Accordingly, by virtue of a rotation of the pad part P about the weakened part 7 as a center, the deployment direction of an airbag from the airbag module 9 provided in the pad part P is aimed downwardly, thereby improving the protection by the airbag for the forward tilting occupant M.

Further, the metal core is composed of a first metal core member A fixed to the steering shaft 5, extending in a transverse direction, and a second metal core member B extending downwardly, the weakened part 7 being formed at a top part of the second metal core member B, and the boss 2 being mounted to a lower part of the weakened part 7. Therefore, the boss 2 is mounted securely to the second metal core member B extending upwardly and downwardly, enabling the boss 2 to be rotated directly forward, about the weakened part 7 as a center.

Further, the top part of the second metal core member B extends downwardly from a position on the first metal core member A separated from the steering shaft 5. As the second metal core member B is connected to the first metal core member A at a position separated from the steering shaft 5, it is possible to dispose the weakened part 7 at a position as high or higher than the steering shaft 5.

The weakened part 7 is formed as a narrowed part of the metal core or as a thinned part of the metal core, and the formation of the weakened part is facilitated.

Further, a bracket 11 having a shape that straddles across the weakened part 7 is provided to maintain the basic function of the weakened part 7, the two end parts of the bracket 11 being joined to the metal core. For one and the same type of metal core, by changing the shape and the material of the bracket 11, it is possible to adjust the strength of the weakened part 7. Thus, it is possible to accommodate a variety of different vehicle types by merely modifying the bracket 11, thereby providing an advantage in terms of cost.

Further, an upper end part of the bracket 11 is joined to the first metal core member A, and a lower end part thereof is joined to the second metal core member B, thereby enabling the achievement of a given strength with a smaller and thinner bracket than would otherwise be required, thereby contributing to lightening of the steering wheel 1.

The contents of Japanese Patent Application No. 11-355022 are incorporated herein by reference.

While a preferred embodiment of the present invention has been described using specific terms, such description is for illustrative purposes, and it is to be understood that changes and variations may be made without departing from the spirit or scope of the following claims.

What is claimed is:

1. A steering wheel for a vehicle, comprising:
   a boss mounted to a vehicle;
   a rim configured annular, and inclined with a lower edge thereof protruding rearwardly;
   a spoke interconnecting the boss and the rim;
   a first metal core member passing through the boss and the spoke, and extending to the rim;
   a second metal core member extending downward from the first metal core member to the rim, the second metal core member being formed with the first metal core member via a weakened metal core member, and comprising a mounting ear;
   a pad mounted to the mounting ear of the second metal core member, and inclined with the second metal core member protruding rearwardly; and
   a bracket configured to straddle across the weakened metal core member and to be fastened at both ends thereof to the first and second metal core members, and adjusting the strength of the weakened metal core member, wherein
   the second metal core member bends forwardly at the weakened metal core member together with the pad, and the pad rotates directly forwardly about the weakened metal core member as a center when the vehicle is subjected to a collision.

2. The steering wheel according to claim 1, wherein the pad comprises an airbag module.

3. The steering wheel according to claim 1, wherein
a top part of the second metal core member extends downwardly from a position on the weakened metal core member.

4. The steering wheel according to claim 3, wherein the weakened metal core member comprises a narrowed part.

5. The steering wheel according to claim 1, wherein the weakened metal core member comprises a narrowed part.

6. A The steering wheel according to claim 1, wherein the weakened metal core member comprises a thinned part.

7. A steering wheel for a vehicle, comprising:

a boss mounted to a vehicle;

a rim configured annular, and inclined with a lower edge thereof protruding rearwardly;

a spoke interconnecting the boss and the rim;

a first metal core member passing through the boss and the spoke, and extending to the rim;

a second metal core member extending downward from the first metal core member to the rim, the second metal core member being formed with the first metal core member via a weakened metal core member, and comprising a mounting ear;

a pad mounted to the second metal core member, and inclined with the second metal core member protruding rearwardly; and a bracket configured to straddle across the weakened metal core member and to be fastened at both ends thereof to the first and second metal core members, and adjusting the strength of the weakened metal core member, wherein the second metal core member bends forwardly at the weakened metal core member together with the pad, and the pad rotates directly forwardly about the weakened metal core member as a center when the vehicle is subjected to a collision, and wherein a whole-length of the bracket is in contact with the first and second metal members.

8. The steering wheel according to claim 1, wherein the bracket comprises a channel-shaped cross-section.

* * * * *